US006772906B2

(12) United States Patent
Wittern, Jr. et al.

(10) Patent No.: US 6,772,906 B2
(45) Date of Patent: Aug. 10, 2004

(54) APPARATUS AND METHOD FOR VENDING FROM A VENDING MACHINE

(75) Inventors: Francis A. Wittern, Jr., Des Moines, IA (US); Roger L. Wilson, Urbandale, IA (US); Gary L. Walke, Bondurant, IA (US)

(73) Assignee: Inland Finance Company, Des Moines, IA (US)

( * ) Notice: Subject to any disclaimer, the term of this patent is extended or adjusted under 35 U.S.C. 154(b) by 98 days.

(21) Appl. No.: 10/023,058

(22) Filed: Dec. 13, 2001

(65) Prior Publication Data

US 2003/0111482 A1 Jun. 19, 2003

(51) Int. Cl.[7] ................................................ B65G 59/00
(52) U.S. Cl. ................................ 221/1; 221/13; 221/21
(58) Field of Search ............................ 221/1, 9, 13, 21; 700/240, 244, 232

(56) References Cited

U.S. PATENT DOCUMENTS 4,359,147 A * 11/1982 Levasseur ................... 194/200
4,494,675 A 1/1985 Stutsman
4,854,477 A * 8/1989 Kurosawa et al. ............. 221/1
5,111,962 A * 5/1992 Oden ............................ 221/1
5,513,772 A 5/1996 Glaser
5,660,304 A 8/1997 Halsey et al.
5,884,806 A 3/1999 Boyer et al.
6,202,888 B1 3/2001 Pollock et al.
2001/0000408 A1 4/2001 Hair, III et al.
2002/0117509 A1 * 8/2002 Whitten et al. ................ 221/9

FOREIGN PATENT DOCUMENTS

EP 0572119 A2 12/1993

* cited by examiner

*Primary Examiner*—David H Bollinger
(74) *Attorney, Agent, or Firm*—McKee, Voorhees & Sease, P.L.C.

(57) ABSTRACT

An apparatus and method for increasing assurance a product has been vended upon an authorized product selection. The method comprises monitoring if a product has been vended during a first vend cycle and if not, commencing a second vend cycle, and stopping a second vend cycle immediately if a product is sensed.

46 Claims, 2 Drawing Sheets

APPARATUS AND METHOD FOR VENDING FROM A VENDING MACHINE

BACKGROUND OF THE INVENTION

A. Field of the Invention

The present invention relates to an apparatus and method for vending vendible products, and in particular, to a methodology and apparatus to attempt to ensure a successful vend every time.

B. Problems in the Art

The art of vending machines has advanced significantly over the years. There has been a proliferation of the number and types of vending machines. Furthermore, there has been a significant increase in the types of products that are vended (e.g. kind, size, shape, weight, value).

One area with need for improvement is ensuring that a selected product is in fact vended to the customer. While this is a desirable goal, it must be implemented in an economical, effective, and efficient way.

There are times when the vending machine is improperly loaded such that there is a gap in products or missing products in the vending machine. The customer may make a selection that results in operation of the machine. However, the gap or missing product does not result in the selected product being produced to the customer. Because the machine has operated, it assumes a successful vend was made. The customer not only does not receive the selected product, but cannot retrieve the money or token used to initiate the vending cycle.

Similarly, in some instances a vending cycle is properly initiated but the product gets hung up or does not make it all the way to a location that is accessible to the customer. For example, there are times when a vending machine operates a complete vend cycle (e.g. operates a motor rotating a spiral for 360 degrees of rotation), but the product is not quite able to fall from the dispensing mechanism. Again, the machine assumes a successful vend was made.

U.S. patent application U.S. 2001/0000408 A1, published Apr. 26, 2001, describes many of the concerns and considerations with respect to these types of problems. This publication is incorporated by reference herein in its entirety.

There is a need for an improvement in the art relative to this issue. U.S. patent application U.S. 2001/0000408 A1 discusses such problems in detail and discloses an attempt at a solution. It uses an optical detector to attempt to automatically detect whether a product actually makes it to a customer-accessible location. The vending machine initiates a vend cycle in response to an appropriate instruction and/or money from the customer. In U.S. patent application U.S. 2001/0000408 A1, the vending machine has one or more horizontal trays, each with one or more horizontally positioned spirals or helixes positioned front to back. Each helix is operatively connected to an independently operable motor. Vendible products are loaded between turns of each spiral in what is referred to as a horizontal column of vendible products. Operation of a motor causes its associated spiral to turn, which is intended to cause all products in the column of products loaded in the spiral to advance toward the front of the spiral. If the optical sensor of U.S. patent application U.S. 2001/0000408 A1, detects a predetermined variation in intensity, the vending machine assumes it was caused by a falling selected product, the vend cycle is assumed complete, the motor is turned off, and the machine waits for the next selection by a customer. U.S. patent application U.S. 2001/0000408 A1 addresses the problems in the art in a specific way. When the vend cycle is initiated, a timer is started. The timer has been pre-set to correspond to rotation of the motor for that spiral well past one complete rotation. If the sensor detects nothing over the first 360 degrees of rotation, the motor does not stop but continues to operate until the timer expires. In U.S. patent application U.S. 2001/0000408 A1, the timer period is selected to be equivalent to about 540 degrees, or one and one-half revolutions of the spiral. The theory is that instead of relying on one motor rotation for one vend cycle, and risking that a product will not be successfully vended, the motor will be allowed to operate for well over one rotation to attempt to give substantial opportunity for at least one product vend to take place. U.S. patent application U.S. 2001/0000408 A1 avoids using motors that have internal switches, well known in the art, that indicate when each 360 degree rotation has occurred, freeing itself from the cost and assumption that 360 degrees of rotation is the standard rotation to use for each vend cycle. Instead, it places reliance upon the optical sensor and an intentional extended time period of possible motor rotation (substantially over 360 degrees), to try to ensure that a successful vend is made each time. At expiration of the predetermined time period, if the optical sensor has not sensed a vend, the machine stops the motor and assumes there is a problem with that selection or column of product, and either refunds credit or prompts the customer to made another selection. Because of this reliance on the optical sensor, substantial pre-calibration steps of the sensor are taken prior to each vend request.

Additionally, U.S. patent application U.S. 2001/0000408 A1 describes in detail a variety of steps that are taken to deter malfunction or manipulation of the vending machine. These appear necessary because of reliance on the optical sensor and use of the above-described methodology to try to ensure a vend every time. While this does attempt to solve the above-discussed problems, its approach can result in the following. If, for example, the sensor is temporarily or otherwise malfunctioning, and such is not detected or acted upon by the vending machine, it is possible the customer did receive a first vend, but then would be given the windfall of a second vend. Examples are discussed in U.S. patent application U.S. 2001/0000408 A1, including the possibility that a product could, in some cases, bypass detection of the sensor, or the sensor does not accurately assume a vend or lack of a vend.

Also, there are times when, at the completion of an unsuccessful vend cycle (e.g. 540 degrees rotation), the product is close to being vendible, or is temporarily hung up or stalled from falling to the detector, or otherwise slightly delayed in reaching the vend sensors. Again, in U.S. patent application U.S. 2001/0000408 A1, the selected time period (and amount of rotation, e.g. 540 degrees) may not be enough to obtain a successful vend. And then, the customer would be denied selection from that column because it would be disabled until the vending machine operator can review and remedy the situation.

Furthermore, there is no disclosed back-up system for operation of a column in U.S. patent application U.S. 2001/0000408 A1 if the optical sensor is indicated to be malfunctioning.

Also, because the motor is immediately stopped when the optical sensor indicates a vend in U.S. patent application U.S. 2001/0000408 A1, there is no general uniformity how much angular rotation of the spiral occurs per vend cycle. Thus, if one product falls out early in a vend cycle (e.g. with 160 degrees rotation), the motor stops the spiral at about 160 degrees for the first vend cycle. If the next-in-line product was loaded or reacts in a manner that it does not vend over the next 540 degrees spiral rotation, it might not vend the next-in-line product; even though the two products might have both vended on two successive 360 degree motor rotations.

Also, since the leading end of the spiral "runs out", the operator may want to doubly make sure that the first few vends will be successful. It is likely the operator will place the first product in the column somewhat back away from the leading end of the spiral, to avoid a problem on the second vend. This can lead to less products being loaded in the column when the machine is re-stocked, which is less productive and efficient for the operator.

U.S. Pat. No. 6,202,888 B1, issued Mar. 20, 2001, also incorporated by reference herein, recognizes there can be problems with product hang up and also with product security. Its solution is to rotate the mechanism that moves the product to a delivery location at least one, and optionally somewhat past one, complete rotation (e.g. by timing), to attempt to ensure that the product in the first position is dispensed. It then reverses rotation back to a home position (one complete revolution position), or behind home position to try to ensure the product can not be vibrated loose by shaking the machine, and awaits the next vend instruction. U.S. Pat. No. 6,202,888 B1 discusses use of a sensor (e.g. an optical sensor) to detect a vended product. It also discusses use of a sensor to detect if a product is present at the front of a helix, ready to be dispensed. It does disclose the ability to use motor switches or home position sensors for the motors to tell when a "home" position for a motor is reached. There is no second vend cycle to attempt to provide a product if no product is sensed as vended after the first cycle, however. The vend cycle is preset to have the motor rotate the helix an angular amount, and then automatically each time reverse direction an angular amount.

Therefore, there is still room for improvement in the art.

BRIEF SUMMARY OF THE INVENTION

It is therefore a principal object, feature, or advantage of the present invention to provide an apparatus and method which improves and/or solves problems and deficiencies in the art.

Other objects, features, and advantages of the invention include a method and apparatus for vending vendible products which:

a. works well for a variety of different vendible product types, sizes, shapes, weights, and values.

b. does not rely only on a product sensor, whether optical or otherwise;

c. has alternative operating mode if a product sensor is indicated to have or does malfunction;

d. provides improved probability of successful vends;

e. does not give a high probability of windfall vends;

f. can provide information helpful to track vending machine performance.

g. provides good product security after each vending cycle.

Other objects, features, and advantages of the present invention will become more apparent with reference to the accompanying specification and claims.

The present invention relates to an apparatus and method for increasing the likelihood a successful vend is made for every authorized customer selection in a vending machine. The vending machine includes a controller, at least one product dispensing system for receiving a column of vendible product and driven by a motor with a home position sensor, and a product sensor to detect if a selected product from the column has been moved out of the column. The motor and product sensor are in operative connection to the controller.

In one aspect of a method according to the invention, there first can be an automatic check of the operation of a product sensor. If the check is negative, the vending machine is instructed to accomplish vend cycles without use of the product sensor. In one embodiment, subsequent vend cycles are accomplished by simply stopping the product dispension motor after each rotation, using the home position sensor associated with the motor.

On the other hand, if the product sensor test is positive, a vend cycle is started by operating the appropriate product dispension motor for the product selection, causing it to begin rotation from its home position. If the product sensor detects a product during that first vend cycle, and before the motor reaches its home position, the controller reads the product sensor and recognizes this as a successful vend. The motor also continues to operate until it reaches its home position. Optionally, the controller can use the recognition of a successful vend in an accounting regimen to keep track of successful vends for that customer selection.

If the product sensor does not sense a successful vend during the first vend cycle by the time the motor returns to home position, the motor is stopped or paused at home position, but the product sensor and controller continues to monitor for a preset time period. If a product is sensed by the product sensor during that period, the controller recognizes a successful vend. The product dispension motor was already stopped or disabled and in its home position, and is ready for a next vend cycle.

If no successful vend is sensed during the pause period after the first vend cycle, a second vend cycle is started by starting the product dispension motor again. Optionally, the controller can keep track of the fact that a second vend has commenced for this product selection and stored for later use. If a successful vend is sensed, the motor is stopped immediately, and the controller reads that the vend has now been successful. The motor is stopped and left in that rotational position regardless of whether it is in the home position. It is ready for initiation of a next vend cycle. When that occurs, the same method would be repeated except during the first vend cycle, the motor would rotate back to home position, even if it is only a small angle of rotation, and stop. If, after the pause period, no vend is sensed, the second vend cycle would begin from that home position.

If a product is not sensed by the time the motor reaches the home position during the second vend cycle, a signal can be created which can activate an indicator of a malfunction, give the customer credit, and/or give the customer a prompt to make an alternative selection. Optionally, the controller can store information indicating that the vend was unsuccessful, even though a second vend cycle for the same product selection was completed.

Instead of disabling the column from further vending, an optional feature is to alternatively allow one or more additional attempts at getting a vend from the column, before disabling it.

DETAILED DESCRIPTION OF THE INVENTION

Figure 1A:
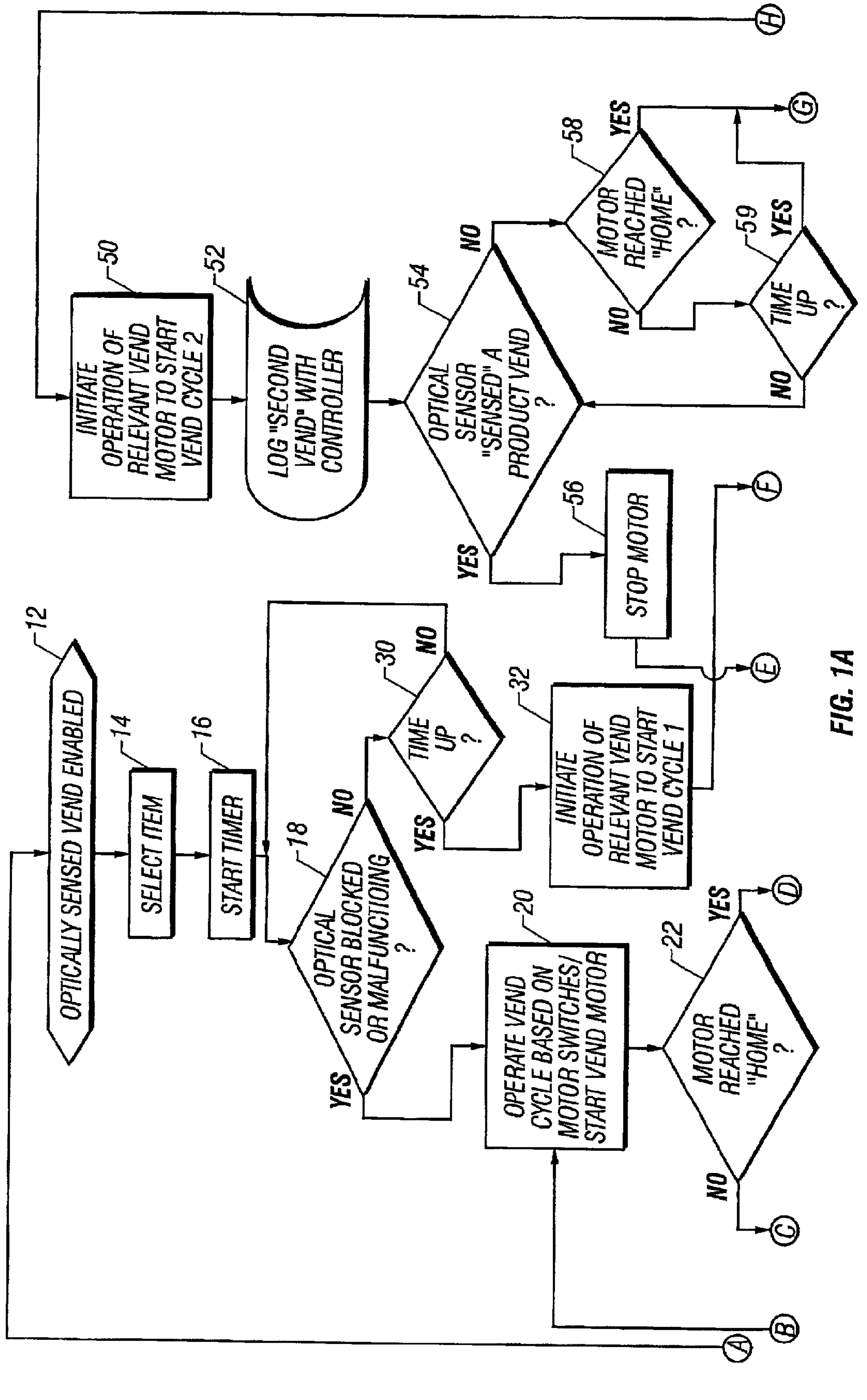
FIGS. 1A and 1B are a flow chart of the operation of one embodiment of a method according to the present invention.

For a better understanding of the invention, one embodiment thereof will now be described in detail. Frequent reference will be made to the appended drawing. Reference numbers will be utilized in the drawing to indicate certain parts and locations in the drawing.

The environment of this example of the invention will be in conjunction with a vending machine having a housing inside of which are a plurality of horizontally positioned trays. Across each tray are a plurality of product dispensing systems, each including an independently controllable motor, adapted to serially deliver vendible products to a dispension location, where each is pushed or falls off the tray and travels to a location where the customer can access it.

The motor has a home position sensor or switch, such as are well known in the art. This allows a controller to know when a motor is or is not in home position.

A set or column of vendible products are loadable into a helix or spiral operatively connected to a motor in preparation for a vending selection. When loaded, the products are normally in a series extending from the back of the vending machine to the front. Upon selection of a certain product in the tray, the appropriate product dispenser actuator or motor operates to move all items loaded in the helix forward; and it is intended that the foremost item be advanced to a location at the front end of the helix and the front edge of the tray. By gravity or other means, it is designed that an item at this location fall from the tray, and drop along a path to a customer-accessible location.

An optical sensor is placed along this path prior to the customer-accessible location. This optical sensor is designed to sense if a product or other object falls or moves past it. U.S. Pat. No. 6,202,888 B1 or published U.S. patent application U.S. 2001/0000408 A1, disclose several types of vending machines and sensors of these general types. They disclose different types of optical sensors for attempting to determine if a product has been vended. There are a number of different types of dispensing mechanisms and product vend sensors which could be used.

In this embodiment, the optical sensor is an infrared emitter/collector set where the emitters are positioned on one side of the product drop path, and the collectors on the other. An example of an optical sensor that can be used is Model VNDA3 available from TAL, Inc. of Rishon le Zion, Israel. An output signal of 5V indicates the beam is blocked and a ground signal indicated an open optical beam. The output signal from the sensor is set at a pin of an interface which is connected to 5 volts through an 11 K Ohm pull-up resistor. Total current draw of the optical sensor should not exceed 50 ma. A change of state of the sensor's output signal should remain constant for 3 msec for proper detection by the controller. Other sensors and reading arrangements are of course possible.

In this embodiment, the motor has a home position sensor. The motor is configured so that one rotation of the motor and its associated spiral "home" to "home" (usually about 360 degrees)One rotation is usually sufficient to move one product in the column sufficiently to be dispensed. Also, it is generally the best way to keep products secure from unauthorized vending by shaking the vending machine. Each motor rotation therefore is intended to move succeeding products to dispension.

The motor can be a model 0333, from Merkle-Korff Industries of Des Plaines, Ill., and include internal sensing switches sensing when the motor has rotated one revolution. This allows a mechanical or electro-mechanical sensing of motor home position, and allows the controller to start and stop the motor when "home" position is sensed. These types of sensors are usually durable and accurate. Each authorized product selection normally results in the motor rotating from home position to home position and stopping until the next product selection.

An example of a controller that can be used is Model 407990 available from Coinco Coin Acceptors of St. Louis, Mo. Such a controller supports a variety of functions and a variety of peripheral devices. Examples are a ten digit vacuum fluorescent display (VFD), a 3×7 matrix keypad, and up to 120 DC motor drives. The controller also can support a coin mechanism, optional bill acceptor, and a card reader.

Power is supplied via a 50/60 Hz transformer with secondary leads supplying 22 VAC to 32 VAC at 3.0 amps. A nineteen position header provides motor drive capability for up to 120 motors (each rated at 24 VDC, 100 mA nominal), arranged in a 12×10 matrix. Motor current is limited to under 500 mA.

An international Multi-Drop Bus Interface has a six-position header for connection to peripherals. Protocol will be in compliance with NAMA's "International Multi-Drop Bus Interface Standard" (Aug. 19, 1994 Revision).

Satellite devices can also be controlled via an Universal Satellite Device (USD) interface. A handheld computer (DEX/UCS style) compliant with NAMA "The Vending Industry Data Transfer Standard", dated Jan. 2, 1992, can be used to program and access (download) vend information from the controller.

The types of vending machines, vending machine trays or organization and structure, motor rotational position sensors, product dispension mechanisms, and product vend sensors can vary and the invention is not limited to any such specific items. These components are well known in the art and available commercially. An example is found in U.S. patent application U.S. 2001/0000408 A1. Therefore, further details about the specifics of these components and their operation and functions will not be given here.

Figure 1B:
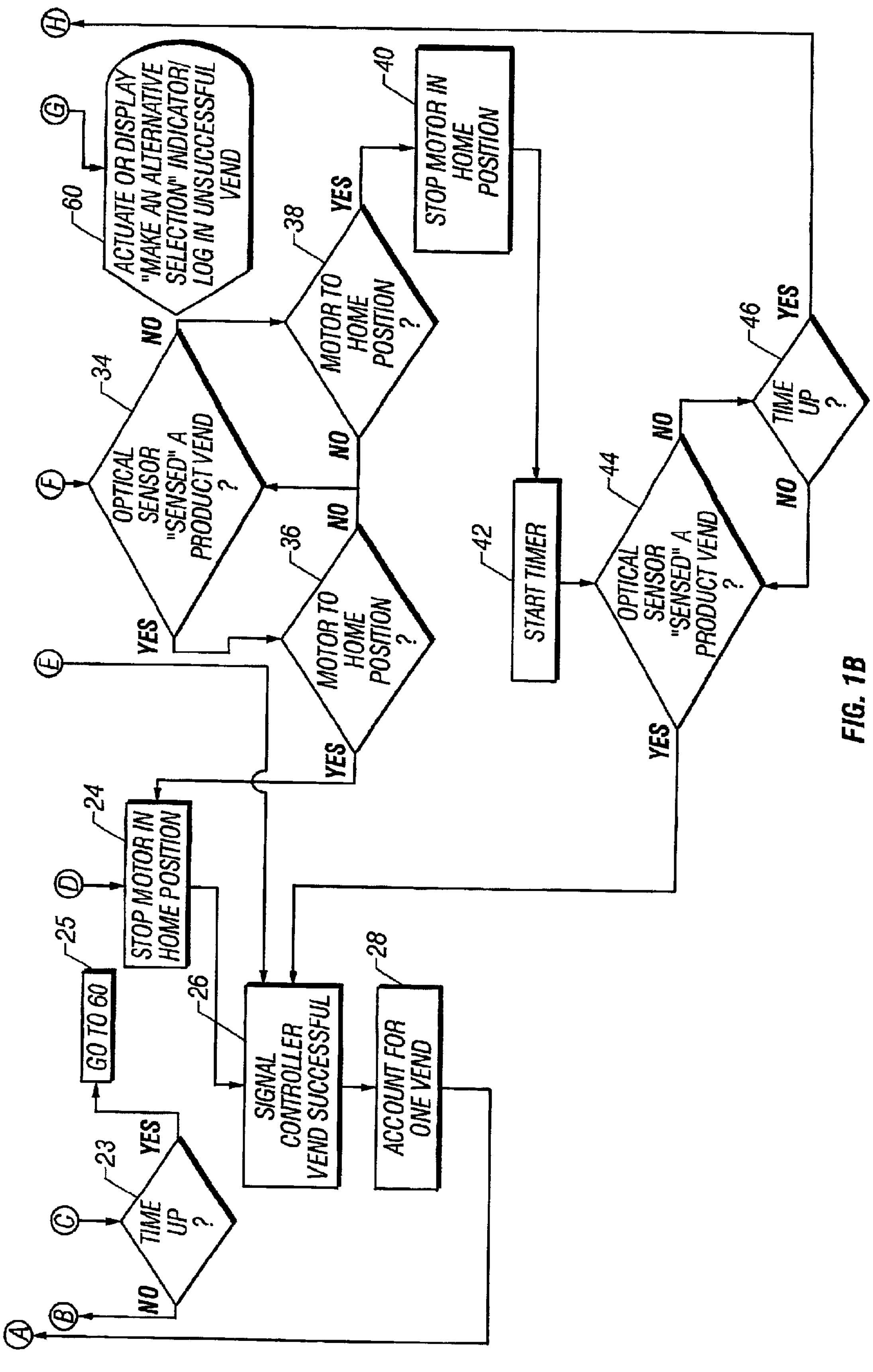

By referring to FIGS. 1A and 1B, a method for trying to ensure successful product dispension for each customer selection, according to an embodiment of the present invention, is shown and will now be described in detail.

As indicated above, the controller can control a plurality of motors (up to 120). However, for simplicity, this method of FIGS. 1A and 1B is described relative to one motor/spiral combination for a product selection from a tray of a vending machine. However, as is obvious, the same method can be applied to any motor selected in the vending machine. It is to be understood, however, that it is common that sets of motors are selected to operate in similar modes, as opposed to individually setting up operation of each motor. For example, it is common to allow all motors on one tray to work in the same way. However, individual selection of operation mode of each motor is possible The infrared emitter and detector of the optical sensor are spaced apart on opposite sides of a product delivery path to form a product vend optical sensor. The optical sensor is in operative communication with the electronic controller for the vending machine, such as identified above and are well known in the art.

As indicated at Step 12 in FIG. 1, the operator of the vending machine can designate whether product selection(s) will be monitored by the optical sensor. This is accomplished by programming or setting the system to recognize that the particular product selection(s) is enabled for optical sensing.

When a customer selects an item from the product selection here being discussed (Step 14), confirmation of an authorized product selection (for example confirmation of an appropriate amount of money) is communicated to the controller. A timer is started (Step 16—here, e.g., 5 milliseconds in length). The controller tests the optical sensor (Step 18) to see if it appears to be operational. If the test does not result in a positive signal (and thus indicating some malfunction or blockage of the sensor), the controller converts the operation of this product dispenser to a non-optical sense mode. In this embodiment, the vending machine defaults to simply having each vend cycle determined by beginning at a home position and ending at a home position, using the motor home position sensors for each motor. The optical sensor is not considered.

For example, if the infrared emitter or receiver is blocked by debris or otherwise inoperable, the controller senses a problem with the optical sensor. What is called the normal home switch-vend cycle is then used. Also, the blockage can be noted in the service mode diagnostics submenu and will indicate the error for the operator.

In the normal home switch-vend cycle mode of operation, upon authorized selection of an item (Step 14), the motor will be instructed to leave home position. Once its return to home position is sensed, the motor will be stopped in home position and the controller will be signaled that a successful vend has been accomplished, regardless of whether one in fact has or has not. (Steps 22, 24, and 26). Additionally, if available, an accounting program will be updated to add that a successful vend has occurred (step 28), again, not knowing whether one in fact has. Note that if the controller does not read that the motor has returned to home after a pre-selected time period (e.g. 5 to 8 sec.), the controller will assume malfunction (e.g. of motor or motor home sensor or electrical connections to same) and will (see step 23) go to step 60, where controller will generate an alarm or indicator to alert the customer and/or an error flag can be stored in the controller for the operator. Also, if at any time the controller senses current loss or a circuit break at or to the motor, it can disable electric power and go to step 60.

On the other hand, if after the 5 millisecond optical sensor test period there is no indication that the optical sensor is blocked (Step 30), the controller will initiate operation of the motor by sending it out of home position, commencing a vend cycle one (Step 32). The optical sensor will be enabled (Step 34). If the optical sensor "senses" a product during that vend cycle one, the controller will allow the motor to return to home position (Steps 36 and 24) and then assume a successful vend (Step 26) to the controller. The motor is thus in home position, ready for a next vend cycle for a next authorized production selection for that motor (Step 28,12).

However, if there is no product vend sensed by the optical sensor during vend cycle one, the motor will be allowed to return to home position and will be stopped or paused there (Steps 38 and 40) for a preprogrammed time period. At this time, a timer will be started (Step 42—e.g., for one second in length) and the optical sensor will be enabled. The controller will continue to monitor the sensor for product delivery. If the sensor during this pause period does indicate a product vend, the controller will be signaled (Step 26) and assumes a successful vend. Current is shut off to the motor. The motor is in home position and thus ready for the next vend cycle (steps 28, 12).

As previously discussed, this short waiting period after completion of vend cycle one allows a product that has been hung up or stalled a chance to be detected, and if so, allows the vending machine to accurately account for a successful vend. The waiting period can be adjusted by appropriate programming of the controller.

If a product is still not sensed as vended after this "pause" period of time (Step 46), the controller initiates a second vend cycle (vend cycle 2) (Step 50). Optionally, a signal can be sent to the controller logging in that a second vend is now occurring because no successful vend was sensed for the first vend cycle (Step 52). This would allow the accounting program to keep track of unsuccessful first vend cycles and/or number of second vend cycles initiated. This information can be advantageously used by the operator to indicate mistakes or sloppy vending machine loading, or other problems that can be attempted to be corrected. It also can give better intelligence with regard to the actual amount of inventory that has been dispensed from the machine relative to the amount of requests or selections by customers. The number of second vend cycle operations for a given vending machine can be stored separately from data on the number of first vend cycles. This can give an indication of how many second vend cycles are occurring and can be used in evaluating circumstances relative to the machine, its loading, its performance, etc.

If vend cycle two is commenced, the optical sensor is enabled and watches for a product during vend cycle 2 (Step 54). It is important to note that in this embodiment, if a product is sensed during vend cycle two, the controller will immediately stop the motor (Step 56). This will occur even if the motor is not in home position. One advantage of doing so is to reduce the possibility that more than one product will be vended to the customer.

For example, it might be that the product from the first vend cycle gets hung up or not quite pushed off of the tray even though the motor comes back to home position at the end of the first vend cycle. If the product does not drop during Step 44, the second vend cycle is initiated. It might take only a fraction of a turn of the motor to complete the movement of that product from the tray and a successful vend. If the motor is stopped immediately, it should not move far enough to dispense a second product as a windfall to the customer. And likewise, the next product will be ready for dispension and the next customer will less likely get two products, one authorized and one a windfall. This is because the process of FIG. 1 repeats starting at step 12 or 14 with a first vend cycle when the next customer makes a product selection; with a difference being the motor will begin operation of this new first vend cycle from its non-home position back and run until back to home, only a part of a revolution. If a second vend cycle is needed, the motor will then be at home, and be allowed to go "home" to "home" accordingly.

This option allows the vending machine operator to purposefully mis-time a selection spiral to protect against "windfall" vends. For example, thin products must have spirals timed to successfully push product from the tray, but this timing often makes it easier for windfall shaking of the next product after rotation.

Note though, that if the next customer does not get a product during the first vend cycle, the system will follow the same protocol as explained before. It will pause to see if a product is sensed, and then go to the second vend cycle; again providing the it second customer with the same higher likelihood that he/she will get a product for his/her selection.

After the motor is stopped during the vend cycle two; a signal can be sent to the controller to indicate a successful vend. The motor will wait for the next authorized selection and will return to home position. As stated, if a successful vend is not sensed, the process will wait (Step 44) and then initiate a second vend cycle.

As can be seen at step 58, however, if after the second vend cycle is completed, the motor again reaches home position without the sensor sensing a successful vend, at this point a signal can be sent to indicate an unsuccessful vend and/or some indicator can be activated to let the customer know to make an alternative selection (Step 60). The controller will still assume a successful vend has not occurred and leave intact the credit approved at the beginning of the process for the customer. The customer can select an appropriate alternative selection and the controller will then attempt to vend that. The controller will consider a particular selection to be empty or sold out. Data is generated and stored in the controller to indicate to the vending machine operator a failure has occurred and that the motor and column should be inspected. This can be done in the form of a flag or error message (e.g. "motor A1 failed"). This forces the vending machine operator to fix the motor and/or do a test vend before allowing that column to be enabled again.

The particular column can be disabled from further vending attempts in the above situation. Other examples include if the controller senses that the motor is disconnected to power or to the controller, or a home position or on-off switch has failed, or there is a short in the motor. In any of these types of cases, the controller can generate a "make another selection" to the customer and/or give an audible or other type of alarm, and restore credit to the customer.

In step 59, a timer intervenes if, during the second vend cycle, there is a motor failure (e.g. open circuit sensed to the motor or a time-out failure). After a pre-set time period, if such motor failure is sensed, the controller would turn the motor off and go to step 60.

It has been found that in the second vend cycle, it is preferred to stop the motor immediately upon the sensing of a product by the optical sensor. While, like the first vend cycle, the controller could read that a successful vend has finally occurred and allow the motor to continue back to home position, it is particularly not preferred to do so when the products being vended are higher value items (e.g. phone cards, cigarettes). The risk that a second product will be ejected from the spiral if the motor is brought back to home in the second vend cycle is to be avoided. While it might be decided in some circumstances that a complete home to home should be allowed in the second vend cycle, to increase the probability that the customer will get a selected product, this is usually outweighed by the desire to disallow a second windfall vend. Another reason for this preference is the case of cigarettes, where the vending machine operator is responsible for sales or tobacco tax for each vended cigarette pack or carton. Records must be quite accurate. Windfall vends, especially undetected, while advantageous to the customer are problematic for the vending machine operator.

An optional alternative to stopping further attempts at vending from a column where an unsuccessful vend occurred is possible. In an "auto-reinstatement" mode, programmable into the controller, even if an authorized selection is made and the first and second vend cycles do not result in the optical sensor signaling a successful vend, the controller can override or delete the error flag. This allows the customer, if he/she wants, to again try to select a product from that column. This feature is particularly useful for glass front vending machines, where the customer can see the product in the machine. If a vend is unsuccessful, the customer may see the desired product is in the front of the helix and probably now ready to vend. Auto-reinstatement allows the customer this option, rather than simply shutting down that column. Auto-reinstatement might avoid dissatisfaction of the customer.

Optionally, a short pause (e.g. 1 sec.) (like the previously described pause after vend cycle one) could also occur after vend cycle two to see if any product has been delayed.

The above-described exemplary embodiment is but one form the invention can take. Variations obvious to one skilled in the art will be included within the invention.

For example, default normal home switch-vend cycle (Step 20) does not need to be utilized. Pre-checking of the optical sensor (Step 18) or the momentary delay or pause of Step 44 do not have to be utilized.

It should be understood that one possible option is to program the motor to stop at an angular position away from home position. For example, the motor could be programmed to stop before it gets to the traditional "home" position for security reasons. By stopping short of home position, it is more likely that the next-in-line product will be farther away from the edge of the tray. Thus, if someone tries to shake or tilt the vending machine to get product to drop, it will be less likely to succeed. But the method of the invention will better ensure that an authorized selection of a product will succeed.

The methodology can be implemented in software such as is within the skill of those skilled in the art.

What is claimed is:

1. A method of vending vendible products from a vending machine comprising:

a) initiating a first vend cycle;

b) monitoring whether a product is sensed during a first vend cycle;

c) if not sensed during the period after the first vend cycle, initiating a second vend cycle;

d) monitoring if a product is sensed during the second vend cycle.

2. The method of claim 1 further comprising assuming a successful vend if a product is sensed during the first vend cycle.

3. The method of claim 2 further comprising resetting for next vend after an assumption of a successful vend.

4. The method of claim 3 wherein the resetting includes returning to a home position.

5. The method of claim 1 further comprising pausing for a predetermined time after the first vend cycle, if no product is sensed, and monitoring for a product during at least a portion of the pause.

6. The method of claim 5 further comprising if a product is sensed during pause, resetting for next vend.

7. The method of claim 1 further comprising if no product is sensed during the monitoring of the second vend cycle, initiating an end procedure.

8. The method of claim 7 wherein the end procedure comprises one or more of the following: (a) alerting the customer of an unsuccessful vend, (b) providing the customer credit for another selection, (c) disabling any further vend cycles, (d) flagging the event for remedial action.

9. The method of claim 7 wherein the end procedure comprises resetting to allow at least one additional vend cycle.

10. The method of claim 9 wherein a predetermined of additional vend cycles are not successful, instigating an alternative end procedure.

11. The method of claim 10 wherein the alternative end procedure one or more of the following: (a) alerting the customer of an unsuccessful vend, (b) providing the customer credit for another selection, (c) disabling any further vend cycles, (d) flagging the event for remedial action.

12. The method of claim 1 further comprising checking the monitoring prior to the first vend cycle.

13. The method of claim 12 wherein the check is for a predetermined time.

14. The method of claim 13 further comprising if the checking of the monitoring indicates error or malfunction defaulting vending cycle operation to a method not dependent on monitoring of product.

15. The method of claim 1 wherein the vending machine comprises a controller, an electromechanical dispensing unit including a motor for effecting vend cycles, a motor position sensor for indicating home position of the motor and a spiral product mover operatively connected to the motor, and an optical product sensor positioned along a path between the dispensing unit and a customer accessible location for monitoring and sensing product dispensed by the dispensing unit, the motor, motor position sensor and optical product sensor in operative communication with the controller.

16. The method of claim 15 wherein on each reset of the dispensing unit, performing a check of operation of the optical sensor, and if operation is deemed compromised, defaulting to operating vend cycles based on sensing home position of the motor from the home position sensor.

17. The method of claim 16 further comprising instigating an end procedure if no return to home position is sensed from the home position sensor.

18. The method of claim 17 wherein the end procedure is one or more of the following: (a) alerting the customer of an unsuccessful vend, (b) providing the customer credit for another selection, (c) disabling any further vend cycles, (d) flagging the event for remedial action.

19. The method of claim 16 wherein during a first vend cycle if a product is sensed by the optical sensor, communicating the same to the controller which assumes a successful vend, and continue operation of the motor back to home, and reset for next vend.

20. The method of claim 19 further comprising pausing the motor in home position if no product is sensed by the optical sensor during the first vend cycle, and monitor for a product.

21. The method of claim 20 further comprising during the pause, if a product is sensed by the optical sensor, communicating the same to the controller which assumes a successful vend and reset for next vend.

22. The method of claim 21 further comprising if no product is sensed during pause, initiating a second vend cycle by beginning operation of the motor from home position.

23. The method of claim 22 further comprising if a product is sensed by the optical sensor during the second vend cycle, communicating the same to the controller which assumes a successful vend, and stop operation of the motor, and reset for next vend.

24. The method of claim 22 further comprising if no product is sensed by the optical sensor during the second vend cycle, operating the motor back to home position.

25. The method of claim 24 further comprising pausing the motor after the motor reaches home position and monitor for a product.

26. The method of claim 24 further comprising during the pause, if a product is sensed by the optical sensor, communicating the same to the controller which assumes a successful vend and reset for next vend.

27. The method of claim 26 further comprising instigating an end procedure if no product is sensed during pause after the second vend cycle.

28. The method of claim 27 wherein the end procedure is one or more of the following: (a) alerting the customer of an unsuccessful vend, (b) providing the customer credit for another selection, (c) disabling any further vend cycles, (d) flagging the event for remedial action.

29. The method of claim 27 wherein the end procedure is a resetting for next vend cycle.

30. The method of claim 1 further comprising keeping track of number of second vend cycles initiated.

31. The method of claim 1 further comprising keeping track of number of second vend cycles relative to number of first vend cycles.

32. An apparatus for vending vendible products comprising:

a) a controller;

b) an electromechanical dispensing unit comprising a motor in communication with the controller and a helical product holder rotatably connected to the motor;

c) a motor home position sensor operatively communicated with the motor and the controller;

d) a product sensor in communication with the controller and located between the dispensing unit and a customer access location in the vending machine;

e) the controller including programming comprising:

1) upon authorized customer selection, instructing a first vend cycle, initiating operation of the motor while monitoring product dispension with the product sensor;

2) if the product sensor indicates a product dispension during the first vend cycle, operate the motor to home;

3) if the product sensor does not indicate a product dispension during the first vend cycle before the motor reaches home, initiate a second vend cycle while monitoring for product.

33. The apparatus of claim 32 wherein the motor home position sensor comprises an internal switch in the motor.

34. The apparatus of claim 32 wherein the product sensor comprises an optical sensor.

35. The apparatus of claim 34 wherein the optical sensor comprises a photo-optical detector.

36. The apparatus of claim 35 wherein the photo-optical detector comprises an infrared emitter and receiver.

37. A method for vending vendible products from a vending machine, wherein the vending machine comprises a controller, an electro-mechanical dispensing unit including a motor for effecting vend cycles, a motor position sensor for indicating home position of the motor and a spiral product mover operatively connected to the motor, and an optical product sensor positioned along a path between the dispensing unit and a customer accessible location for monitoring and sensing product dispensed by the dispensing unit, the motor, motor position sensor and optical product sensor in operative communication with the controller, comprising:

a) Pre-testing operability of the optical sensor;

b) Default to use of motor home position sensor for indication of completion of a vend cycle if the optical sensor fails the pretest;

c) If the optical detector passes the pretest

1) Initiate a first vend cycle by initiating rotation of the motor while monitoring for product with the optical sensor;

2) If a product is sensed, reset to step a) and operate motor back to home;

3) If a product is not sensed during the first vend cycle, operate motor to home, pause and monitor for product with the optical sensor;

4) If a product is sensed during pause, reset to step a);

5) If a product is not sensed during pause, initiate a second vend cycle by initiating rotation of the motor and monitor for product with the optical sensor;

6) If a product is sensed during the second vend cycle, stop the motor where it is at in rotational position and reset to step a);

7) If a product is not sensed during the second vend cycle, operate the motor to home.

38. The method of claim 37 further comprising optical sensing by photo-optical technique.

39. The method of claim 38 further comprising sending a signal to a controller if a product is sensed.

40. The method of claim 37 further comprising defaulting to a stop on home position vend protocol.

41. The method of claim 37 further comprising sending a signal indicating unsuccessful vend after the first cycle.

42. The method of claim 37 wherein the pause after the first vend cycle is a predetermined period of time.

43. The method of claim 37 further comprising a pause period after an unsuccessful second vend cycle.

44. The method of claim 37 further comprising immediately stopping the second vend cycle upon sensing of a product.

45. The method of claim 44 further comprising alerting a customer if a product is not sensed after the second vend cycle.

46. The method of claim 45 further comprising allowing at least one additional vend cycle if a product is not sensed after the second vend cycle.

* * * * *